United States Patent Office 3,512,713
Patented May 19, 1970

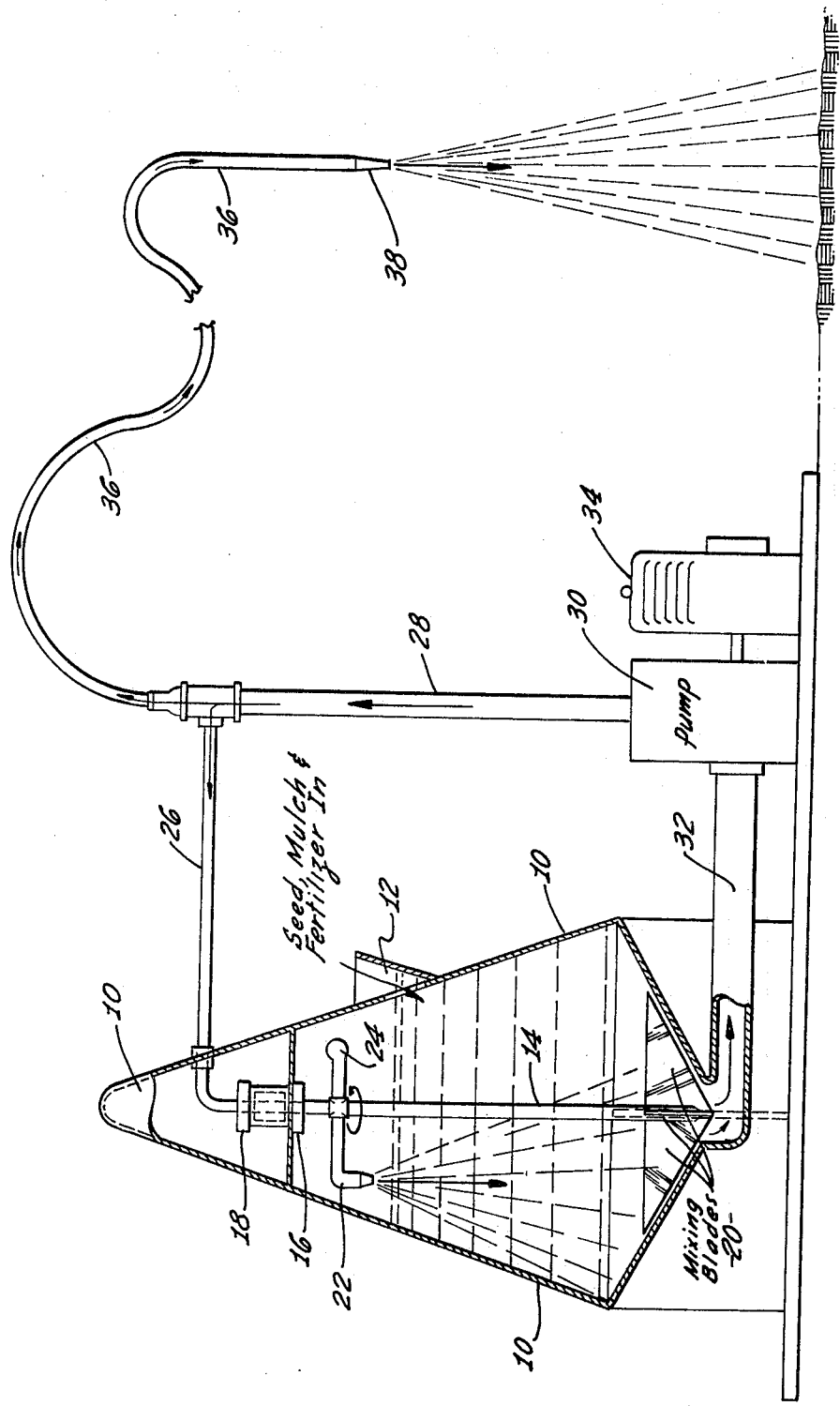

3,512,713
AGRICULTURAL APPARATUS
Richard A. Carlyon, Jr., 24848 Long Valley Road,
Hidden Hills, Calif. 91302
Filed Mar. 11, 1968, Ser. No. 712,034
Int. Cl. B05b 9/04
U.S. Cl. 239—127          5 Claims

ABSTRACT OF THE DISCLOSURE

Improved agricultural apparatus is provided which may be mounted, for example, on the back of a pick-up truck, and which may be used simultaneously to mulch, fertilize and seed an area in a convenient and efficient manner.

RELATED COPENDING APPLICATION

Application Ser. No. 636,825, filed May 8, 1967, Richard A. Carlyon, Jr.

BACKGROUND OF THE INVENTION

As described in the aforesaid copending application, it has been found feasible for landscaping purposes to utilize apparatus which can provide a mixture of mulch, fertilizer and seed. The apparatus is transported to the site, and operated at the site to spread a slurry over the area on which the lawn, or other ground cover or landscaping is to be grown.

As also mentioned in the aforesaid copending application, the prior art apparatus usually includes a tank, and a pump and hose to be used in conjunction with the tank. These components are mounted on a trailer and hauled to the site. The tank is then filled with water, usually from a garden hose, and the mulch, fertilizer and seed are poured into the tank. The ingredients are then mixed in the tank into a slurry. This being achieved either manually or by some mechanical means. The pump is then actuated, and it pumps the slurry from the tank through the hose, the latter being directed over the area to be covered.

Improved apparatus of the type described above is described and claimed in the copending application; and the said apparatus has the advantage in that it is efficient in its operation, and it can be operated easily by one man. The apparatus described in the copending application includes a water reservoir tank and a separate slurry tank. With such an arrangement, the reservoir can be filled for a subsequent operation, while the slurry from the slurry tank is actually being pumped and sprayed over the area to be covered. The described apparatus also includes a circulating system which extends through the pump and in which the ingredients of the slurry are mixed. The circulating system discharges most of the slurry back to the slurry tank, and sets up a movement of the slurry in the slurry tank to maintain the ingredients in a mixed condition.

The apparatus of the present invention is generally similar to the apparatus described and claimed in the copending application. However, the present apparatus is simpler and less expensive, and is predicated on somewhat different operating principles.

In the apparatus of the present invention, a single tank is used, and no attempt is made to maintain the slurry in motion around the tank. Instead, a movable nozzle is provided which, in the embodiment to be described, rotates as it feeds the slurry back into the tank, so as to maintain the slurry evenly distributed around the tank. The apparatus of the present invention may use a single rotating nozzle, if so desired, and it and its associated line may have a relatively large size so as to avoid clogging.

BRIEF DESCRIPTION OF THE DRAWING

The single figure shows, in somewhat schematic form, one embodiment of the improved apparatus of the present invention.

DESCRIPTION OF THE ILLUSTRATED EMBODIMENT

As previously pointed out, the agricultural apparatus of the present invention is a self-contained unit, which may be driven or hauled to a selected site. As also mentioned, the apparatus may conveniently be mounted on a small pick-up truck, or on a separate trailer. When the apparatus is taken to the site, it may be operated to spray a slurry of mulch, fertilizer and seed over the area to be covered at the site.

As shown in the diagram, the apparatus includes a tank 10. The tank 10 has a generally conical configuration, for reasons to be explained. A hopper 12 is provided at one side of the tank 10, and this hopper serves to feed the materials into the tank, as well as the make-up water. A central rotatable shaft 14 extends upwardly along the central axis of the tank, and this shaft is supported within the tank for rotation by appropriate bearings 16 and 18.

A series of mixer blades 20 are provided at the lower end of the shaft 14, and these blades rotate with the shaft. The blades 20 serve to mix the ingredients of the slurry and to prevent the ingredients from settling to the bottom of the tank. The blades 20 also serve as a brake for the shaft 14, and prevent excessive rotational speed thereof.

A nozzle 22 is affixed to the shaft 14, and the nozzle extends radially outwardly from the shaft and down towards the bottom of the tank. A counterweight 24 is provided diametrically opposite to the nozzle 22. It will be appreciated that several nozzles may be used, obviating the need for the counterweight 24. However, a single nozzle permits a relatively large diameter to be used, and this avoids any tendency for the system to clog. For example, in a constructed embodiment, a 50° nozzle capable of delivering 150 gallons of slurry per minute was used. The nozzle 22 is turned slightly with respect to the plane of the drawing, so that when the slurry is forced through it under pressure, it tends to turn the shaft 14.

The nozzle is fed by an inlet line 26 which, in turn, is coupled to an exhaust line 28 extending from a pump 30. The intake to the pump 30 is coupled to a slurry outlet line 32 from the bottom of the tank 10. In the constructed embodiment, the tank 10 was designed to hold, for example, 180 gallons of slurry. The outlet line 32 has a diameter of 4 inches, and the inlet line 26 has a diameter of 2 inches in the constructed embodiment. The pump 30, for example, may be driven by the motor 34 of the truck on which the apparatus is mounted, or by any other appropriate means.

A hose 36 is coupled to the line 28, and an adjustable nozzle 38 is provided at the end of the hose. The nozzle 38 may be turned to a closed position, during which the slurry merely circulates in the system. When the nozzle 38 is open, part of the slurry bleeds off through the hose 36 and may be sprayed over the area to be covered.

In the operation of the apparatus, the appropriate seed, mulch and fertilizer, together with the desired amount of water are fed into the tank 10 through the hopper 12. The pump 30 is started, and it circulates the slurry through the system, as shown by the arrows in the lines 38, 28 and 26. The pressure of the slurry through the nozzle 22 causes the nozzle and the shaft 14 to rotate. The slurry in the tank remains stationary. However, the circulating slurry fed into the tank is sprayed through the nozzle 22 as the nozzle rotates, and distributed over the surface of the slurry in the tank in an agitated manner.

The ingredients in the slurry are thoroughly mixed by the action of the pump 30 during the circulation of the slurry, and also by the agitating spraying action of the nozzle 22, as the nozzle turns in the tank 10. Also, the ingredients of the slurry are held in suspension by the blades 20, which also serve as a brake for the rotating shaft 14 and nozzle 22.

The shape of the tank 10 is such that as the level of the slurry in the tank rises and falls, it follows the general contour of the spray from the nozzle 22, so that there is maximum engagement between the spray and the surface of the slurry in the tank, and minimum interference by the side of the tank. This tends to a maximum agitation of the slurry as it is sprayed into the tank, for an efficient mixing action.

The invention provides, therefore, a simple and economical agricultural apparatus, which is easy to operate and yet which is extremely efficient in its operation.

What is claimed is:

1. Agricultural apparatus for providing a mixture containing mulch, seed, fertilizer, and the like, to a selected area to be cultivated, said apparatus including: a tank forming a reservoir for a slurry of the aforesaid mixture and having an inlet at the top thereof and an outlet at the bottom thereof; a pump having an intake and an outlet; pipeline means coupling the outlet of said tank to the inlet of said pump to draw the slurry from the tank to said pump, and further pipeline means coupling the outlet of said pump to the inlet of said tank to circulate pressurized slurry from said pump to said inlet; a shaft mounted in said tank and extending in a generally vertical direction when the apparatus is in use; and nozzle means in said tank mounted on said shaft and extending radially outwardly therefrom and having an end portion disposed above the normal level of the slurry in said tank and directed down towards the surface of the slurry in said tank, said nozzle means being coupled to said further pipeline means and rotating about the longitudinal axis of said shaft upon the passage therethrough of the pressurized slurry from said pump to spray the pressurized slurry over the surface of the slurry in said tank and to maintain the slurry evenly distributed around the tank.

2. The apparatus defined in claim 1 in which said tank has a generally conical shape with a diameter increasing towards the bottom thereof to permit maximum engagement between the slurry spraying from said nozzle and the surface of the slurry in the tank and minimum interference with the wall of the tank, as the level of the slurry in the tank falls and rises.

3. The apparatus defined in claim 1, and which includes an outlet hose coupled to said further pipeline means, and an adjustable control nozzle mounted on said hose to cause said hose to bleed off a portion of the slurry circulating in said further pipeline means when said adjustable control nozzle is open.

4. The apparatus defined in claim 1 and which includes a hopper mounted in the side of said tank to enable the mixture materials and make-up water to be fed into the tank.

5. The apparatus defined in claim 1 and which includes a counterweight mounted diametrically opposite to said nozzle and rotatable therewith about said longitudinal axis.

References Cited

UNITED STATES PATENTS

| 1,204,733 | 11/1916 | Barton | 259—36 |
| 2,987,260 | 6/1961 | Sasnett | 239—251 X |
| 2,988,286 | 6/1961 | Snyder et al. | 239—142 X |
| 3,025,006 | 3/1962 | Maurath | 239—142 X |

M. HENSON WOOD, Jr., Primary Examiner

M. Y. MAR, Assistant Examiner

U.S. Cl. X.R.

222—195; 239—142, 228, 251; 259—36